United States Patent [19]
Lodetti

[11] Patent Number: 5,506,380
[45] Date of Patent: Apr. 9, 1996

[54] ELECTRO-EROSION MACHINE WITH A TANK FOR HOLDING A DIELECTRIC

[75] Inventor: Attilio Lodetti, Losone, Switzerland

[73] Assignee: AG Für Industrielle Elektronik, Losone, Switzerland

[21] Appl. No.: 255,317

[22] Filed: Jun. 7, 1994

[30] Foreign Application Priority Data

Jun. 21, 1993 [DE] Germany ............... 43 20 530.5

[51] Int. Cl.$^6$ ........................... B23H 7/00
[52] U.S. Cl. .................. 219/69.11; 204/224 M
[58] Field of Search .............. 219/69.11, 69.14; 204/129.1, 224 M

[56] References Cited

U.S. PATENT DOCUMENTS 5,078,234  1/1992  Lin ...................... 219/69.14
5,391,850  2/1995  Mueller .................. 219/69.14

FOREIGN PATENT DOCUMENTS 63-312023  12/1988  Japan ................... 219/69.11
64-11722   1/1989   Japan ................... 219/69.14
3-196917   8/1991   Japan ................... 219/69.11
2230995    11/1990  United Kingdom ......... 219/69.14

Primary Examiner—Geoffrey S. Evans
Attorney, Agent, or Firm—Cohen, Pontani, Lieberman, Pavane; Christa Hildebrand

[57] ABSTRACT

An electro-erosion machine with an essentially cylindrical tank (14) for holding a liquid dielectric and divided longitudinally into at least two sections (18 & 20). The sections slide together and apart along the circumference.

19 Claims, 6 Drawing Sheets

ELECTRO-EROSION MACHINE WITH A TANK FOR HOLDING A DIELECTRIC

BACKGROUND OF THE INVENTION

1. Field of the Invention

The invention relates to an electro-erosion machine with an essentially cylindrical tank for holding a liquid dielectric. The cylinder is divided longitudinally into at least two sections.

In die-sinking machining, material is removed and rinsed with a liquid dielectric inside a tank that is either entirely enclosed or open at the top, and at least partly full of the dielectric.

To ensure adequate flushing, any particles removed from the electrodes (the work and the excavator) are filtered out of the dielectric, and the dielectric is cooled. The dielectric is pumped into and out of the tank.

One significant determinant of a satisfactory dielectric tank is access to the machining point.

State-of-the-art electro-erosion machine features a wide variety of dielectric tanks. Most of them prevent direct access to the machining point, and many are highly complicated.

2. Discussion of the Prior Art

An electro-erosion machine is known from German A 3 303 758 (Schiess). The front wall of its upright stand simultaneously constitutes the rear wall, and the work support the bottom, of a rectangular dielectric tank. The other sections of the wall slide up and down. Such a machine provides very satisfactory access to the work support once the tank has been lowered, which facilitates automation, although it is relatively complicated. In the other embodiments described in the same document it is only separate components of the dielectric tank, the door for example, that move, sliding up and down or swinging in one or more directions on hinges. The tank is preferably sealed with inflatable seals. The dielectric tanks described in A 3 303 758 are, with their sliding or swinging door, relatively complicated to manufacture, and allow only limited access to the work support. They render the overall machine (or plant) difficult to monitor and inhibit rapid machining.

German C 3 444 390 (AGIE) describes an electro-erosion machine incorporating a dielectric tank that also travels up and down. This design is an improvement over the one described in German A 3 444 390.

European Patent 0 347 716 (AEG) describes an electro-erosion machine with a dielectric tank that has accordion walls. It is also complicated. It is too high, and the work-support guides are too far from the surface of the work, which further compromises precision.

Electro-erosion machine with completely enclosed essentially cylindrical dielectric tanks is known from U.S. Pat. No. 3,647,669 (Kelso), U.S. Pat. No. 3,677,928 (Fleury), German A 3 246 776 (Daimler), European A 0 132 935 (Inoue), French A 2 069 863 (Amsted), and French A 2 589 375 (Renault). Access into these tanks is admittedly very limited in that the walls cannot be opened.

German A 2 540 664 (Langmatz) discloses generic electro-erosion machine that also has a cylindrical dielectric tank. The wall is attached to the bottom of the tank by magnets. The tank is sealed by an inflatable hose. The tank in one version of the machine is composed of separate parts secured together at a T joint.

Electro-erosion machining requires not only the precisely controlled removal of high volumes of material while leaving a smooth surface but also as much automation and as continuous an operation as possible. A dielectric tank with limited access can make the machine difficult to load and necessitate turning it off to "re-equip."

SUMMARY OF THE INVENTION

The object of the present invention is to simplify operation of electro-erosion machine with a tank for a dielectric.

This object is attained in accordance with the present invention provides for an electro-erosion machine with an essentially cylindrical tank for holding a liquid dielectric, and where the tank is divided longitudinally into at least two sections, wherein the sections slide together and apart along the circumference. Or, the machine in accordance with the present invention incorporates an essentially cylindrical dielectric tank with a wall divided longitudinally into at least two sections that slide together and apart along the circumference.

The dielectric tank in the machine in accordance with the present invention is accordingly simple and essentially facilitates access to the machining point. If the wall of the cylindrical tank comprises exactly two sections, it can be opened 180° around the axis. If the wall comprises more than two sections, it can be opened even further. The walls can be opened and closed just by sliding them apart and together around the axis. This approach is not only simple, but also entails the advantage that the open wall sections will not project out of the tank. "Cylindrical" herein includes shapes that approach the circular in section, octagonal cylinders for example.

The wall sections in one particularly simple and accordingly preferred embodiment of the present invention are semicircular. Once the sections have been mutually displaced 180° the user will have almost laterally unlimited access to the machining point.

The wall sections in one particularly preferred embodiment of the invention slide mutually parallel. One section will have a slightly shorter diameter than the other, and can slide in behind it. The advantages are that the open "door" will not occupy any extra space and that access to the machining point will not be impeded. Furthermore, no dielectric can leak out of the open tank. Less space will be occupied. This tank is also less expensive than the removable state-of-the-art tanks.

One wall section in another version of the invention is or can be fixed in a groove in the bottom of the dielectric tank.

At least one of the wall sections in another version slides back and forth in the groove. The groove guides the sliding section or sections and is an important prerequisite to automation of the tank. Both sections slide back and forth in one or more grooves in this embodiment, and one can be fixed. The direction that the tank opens in can accordingly be easily determined in accordance with the particular model of machine and the same type of tank can be used with every model. Access can be from the front for a "conventional" model for example and from the side in the event of automated and robot-loaded machine. The overall machine will not need to be redesigned or redimensioned.

It will also be of particular advantage for the overall dielectric tank to rotate around the work support.

The actions of the tank in another and especially preferred embodiment of the invention are computerized or numerically controlled or both. It is of course currently the practice to automate more and more machining functions. Comprehensive automation of such a tank's actions basically becomes possible, however, only with the reliably controlled and practical tank for holding a dielectric in accordance with the present invention.

The sliding wall section slides back and forth in other preferred embodiments on runners, tracks, or rollers. Such a section will slide particularly readily.

Inflatable or solid seals between the separate components of the tank are of advantage. Inflatable seals in particular combine ease with reliability.

The wall sections can also be sealed off from one another by inflatable or solid seals.

A motor is coupled to the sliding wall section in one embodiment of the invention. One particular advantage of this novel dielectric tank is a readiness for automation deriving from its motorization.

It is of advantage to interpose a cable transmission comprising a roller with several coils of cable wrapped around it between the motor and the sliding wall section. This is a very simple means of sliding the section back and forth.

Embodiments of the present invention will now be specified with reference to the accompanying schematic drawing, wherein

DESCRIPTION OF THE PREFERRED EMBODIMENT(S)

The terminology employed in what follows is intended to make the invention more comprehensible without limiting it in any way. The terms up, down, narrower, and wider in particular refer to machine of conventional design and dimension conventionally employed.

Figure 1:
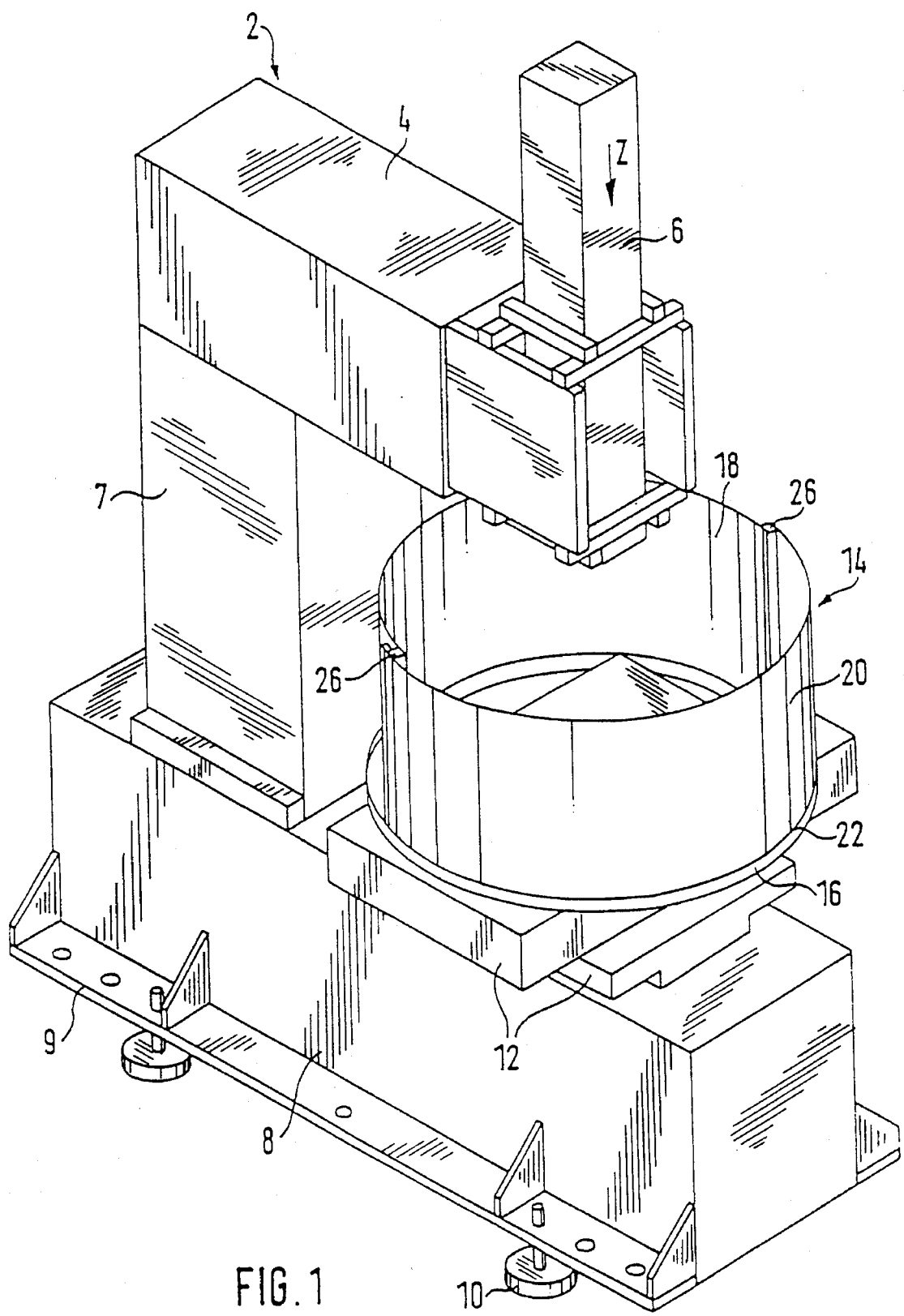
FIG. 1 is a perspective view of one embodiment of electro-erosion machine in accordance with the present invention.

The excavating electro-erosion machine 2 illustrated in FIG. 1 is intended to remove material from an unillustrated work. FIG. 1 illustrates for simplicity's sake only those components of the machine that are relevant to the present invention. Such basic components as the flushing system, the generator, and the numerical or computer controls are considered known and are accordingly not represented.

The stand is shaped like a C. Mounted on its upper arm 4 is an electrode holder 6 that slides back and forth in the Z direction. Mounted on the lower end of holder 6 is an excavating electrode.

Upper arm 4 is connected at the rear of the machine to a base 8, which constitutes the lower arm of the C, by an upright 7. Secured to the bottom of base 8 is a flange 9. Flange rests on feet 10. Resting on lower arm 8 is a work support 12 that slides freely within the XY plane. Resting on work support 12 is a cylindrical tank 14 for containing dielectric.

Tank 14 comprises a base 16 and a wall consisting of two semicylindrical sections 18 and 20. Wall section 18 is fixed to base 16, and wall section 20 slides parallel to it.

Wall sections 18 and 20 are positioned in a groove 22 that extends along the edge of base 16. An opening can accordingly be created in the wall of tank 14 facing any desired direction.

Figures 6, 6A:
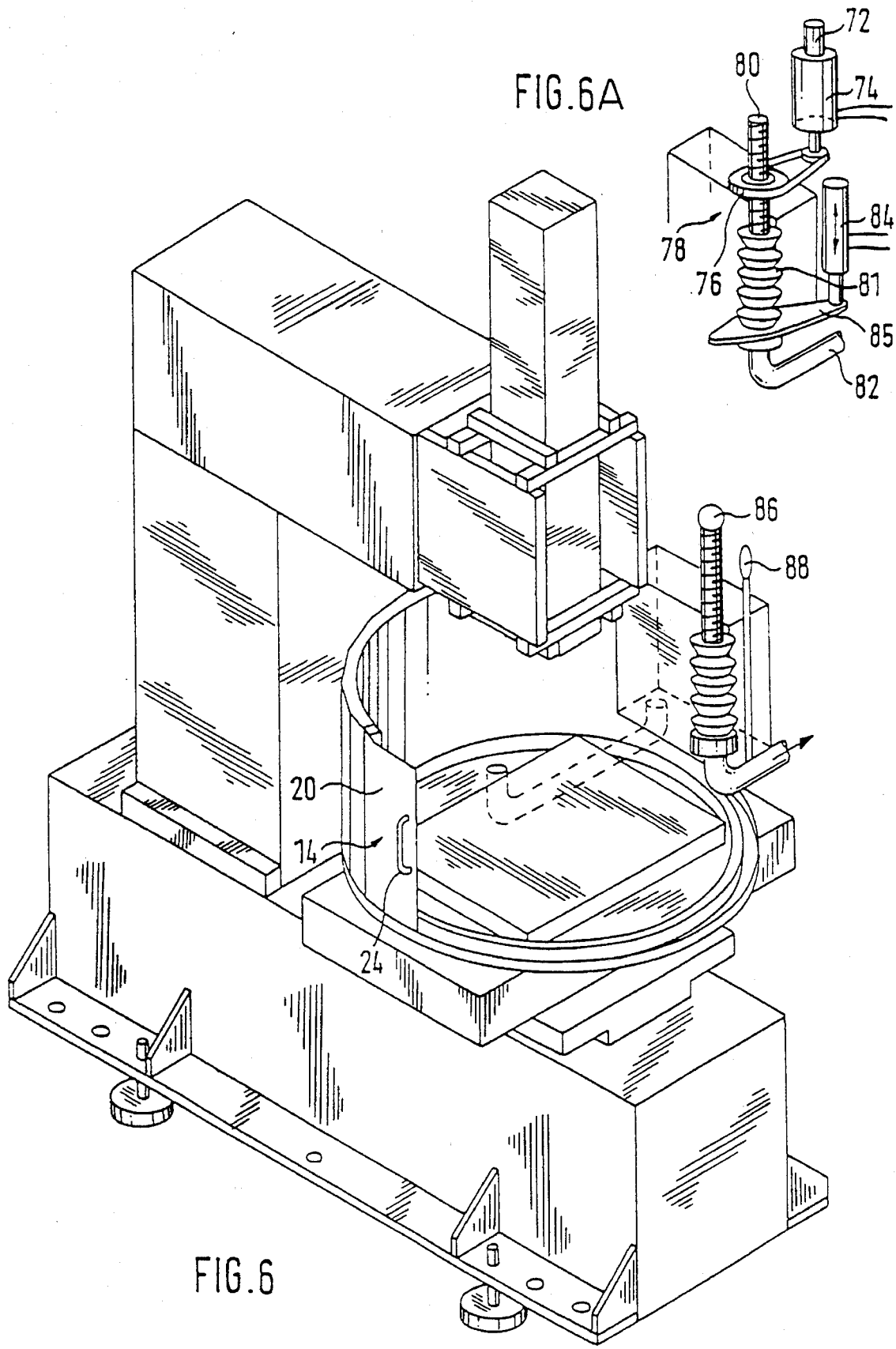
FIG. 6 is a perspective view of still another embodiment.
FIG. 6a is a detailed perspective view of a tank level regulator shown in FIG. 6.

The tank wall can be opened and closed by a handle 24 (covered by other components in FIG. 1 but visible in FIG. 6). Wall section 18 is sealed off from wall section 20 by inflatable seals 26.

Figure 2A:
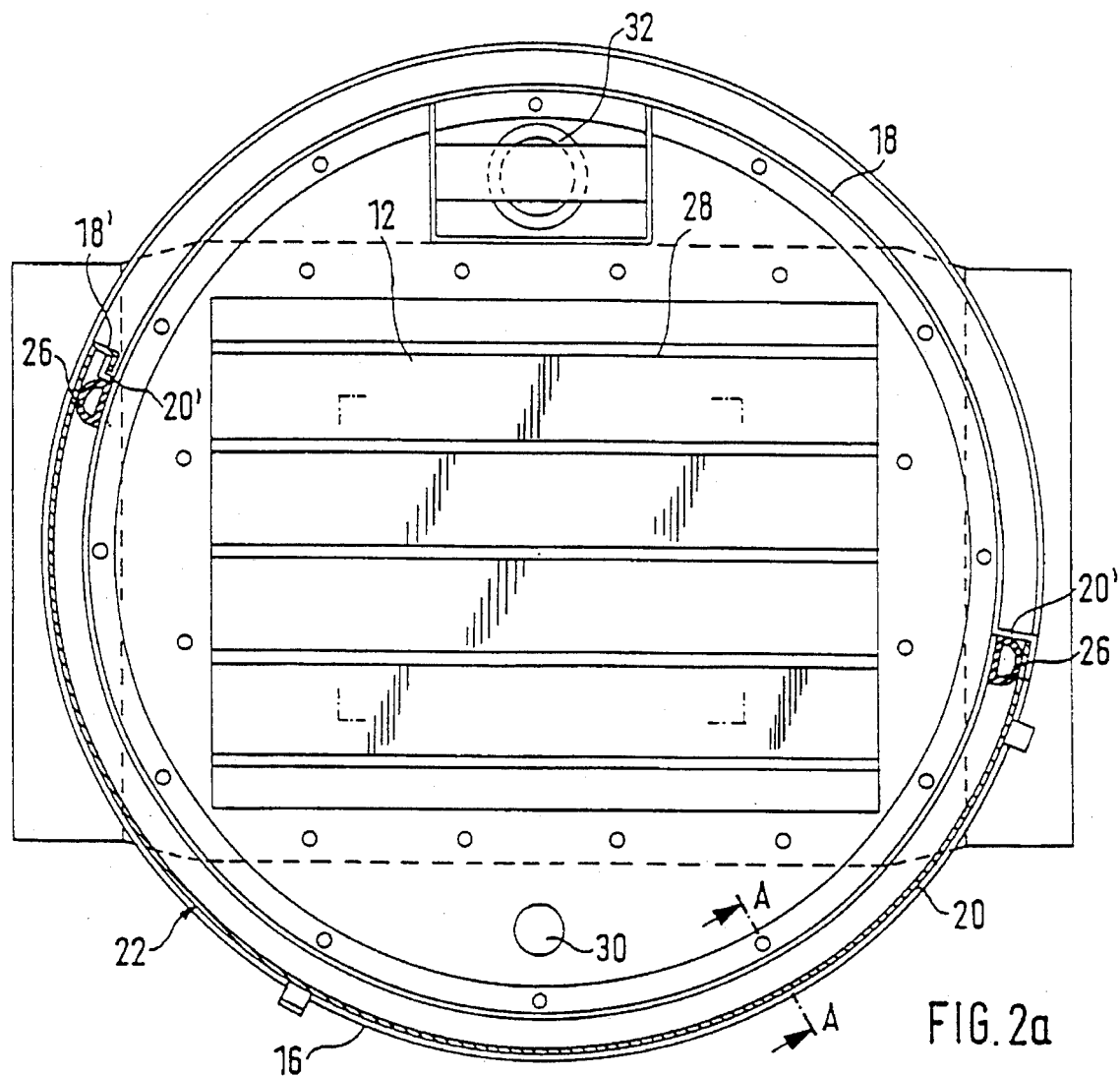
FIG. 2a is a schematic top view of another embodiment.

FIG. 2a is a top view of the work support 12 and tank 14 in another embodiment of the invention. Wall section 20 has a slightly longer radius than wall section 18. Wall sections 18 and 20 engage at bent-in edges 18' and 20'. The work can be secured in a tensioning pallet 28. The dielectric is supplied and removed through lines 30 and 32.

Figure 2B:
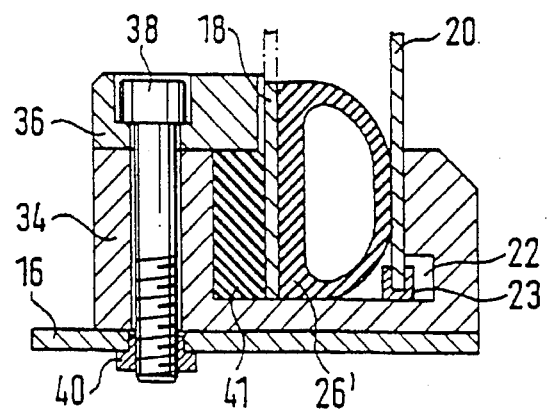
FIG. 2b is a section along the line A—A in FIG. 2a, FIG. 3 is a perspective view of still another embodiment.

FIG. 2b illustrates the relative positions of sections 18 and 20 and of an additional seal 26' in groove 22. Groove 22 is accommodated in a track 34. Track 34 is secured to base 16 by a screw 38 that extends through a component 36 at the top of the track and through the base and is tensioned by a nut 40. Wall sections 18 and 20 are sealed off from each other and from track 34 by inflatable seal 26' and a solid seal 41. Section 20 travels in U section 23.

Figure 3:
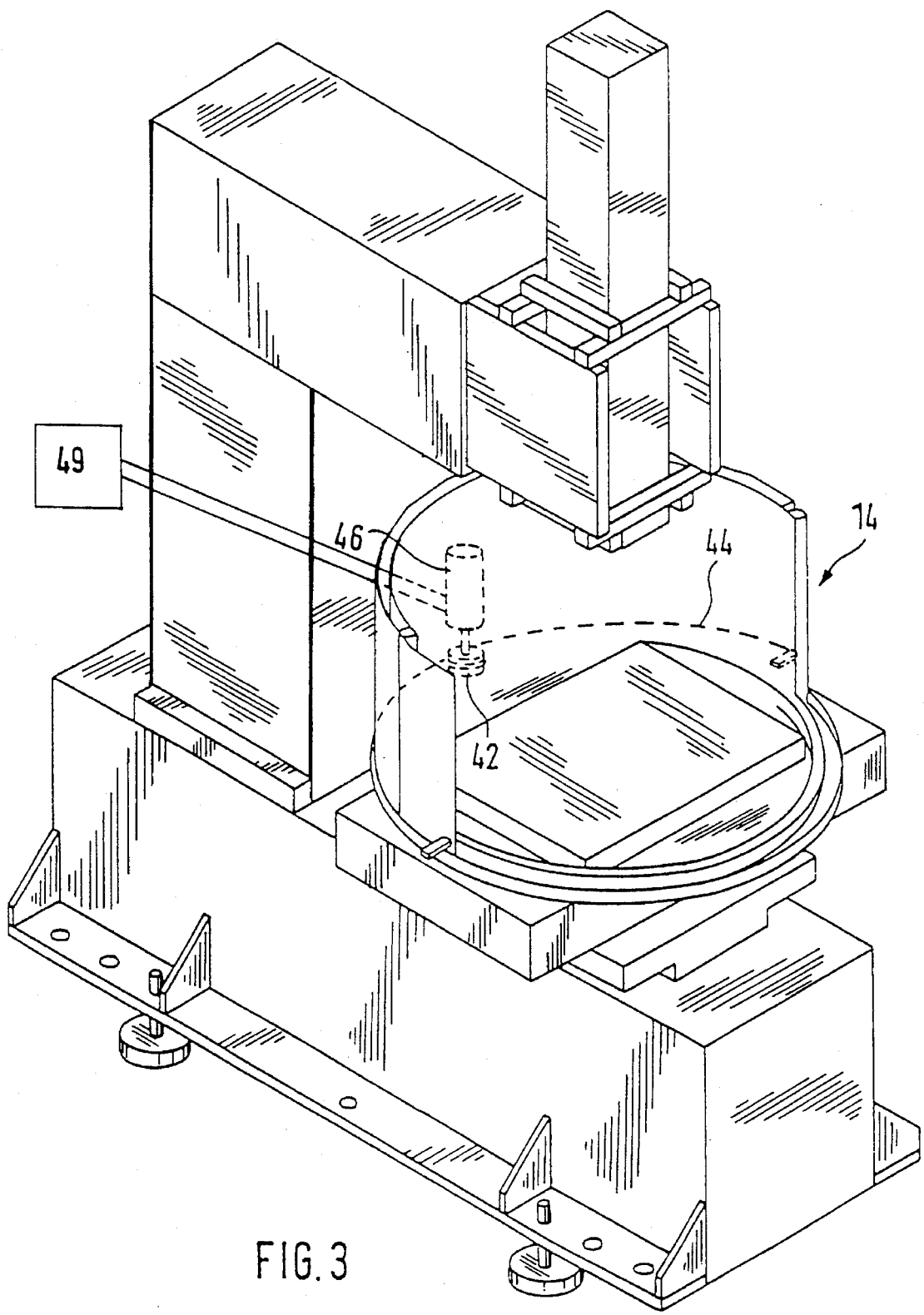
Figure 4:
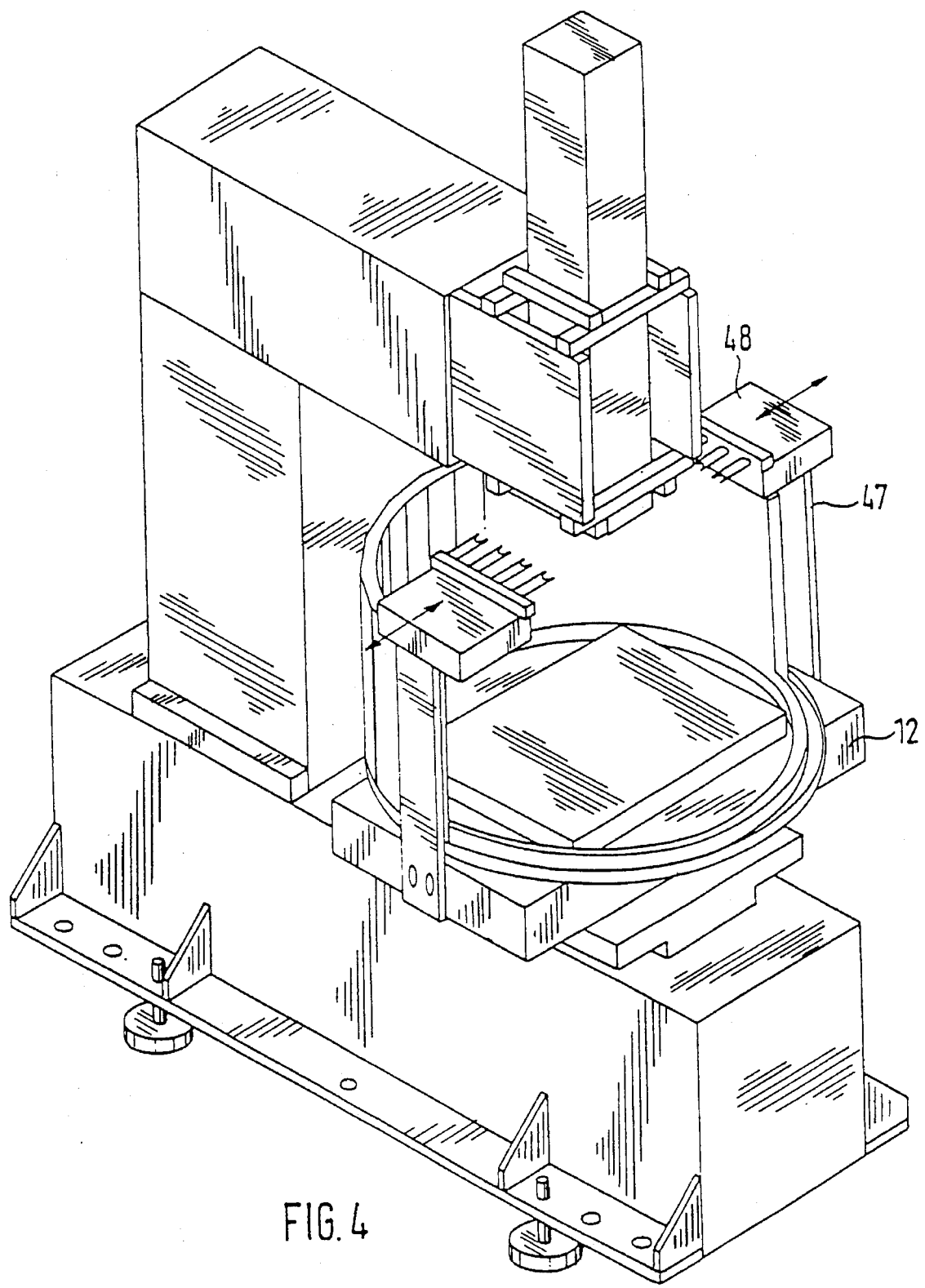
FIG. 4 is a perspective view of still another embodiment.

A length of cable 44 made of metal or plastic, wraps twice around a roller 42, illustrated in FIG. 3. This mechanism is driven by a motor 46 and is controllable by a numerical controller 49 and represents a simple means of opening and closing the wall of dielectric tank 14 automatically. FIG. 4 illustrates the wall open and accordingly demonstrates the practically unimpeded access to the machining point.

FIG. 4 illustrates simple means of supplying tank 14 with lengths of electrode from magazines 48 mounted on uprights 47 secured to work support 12.

Figure 5:
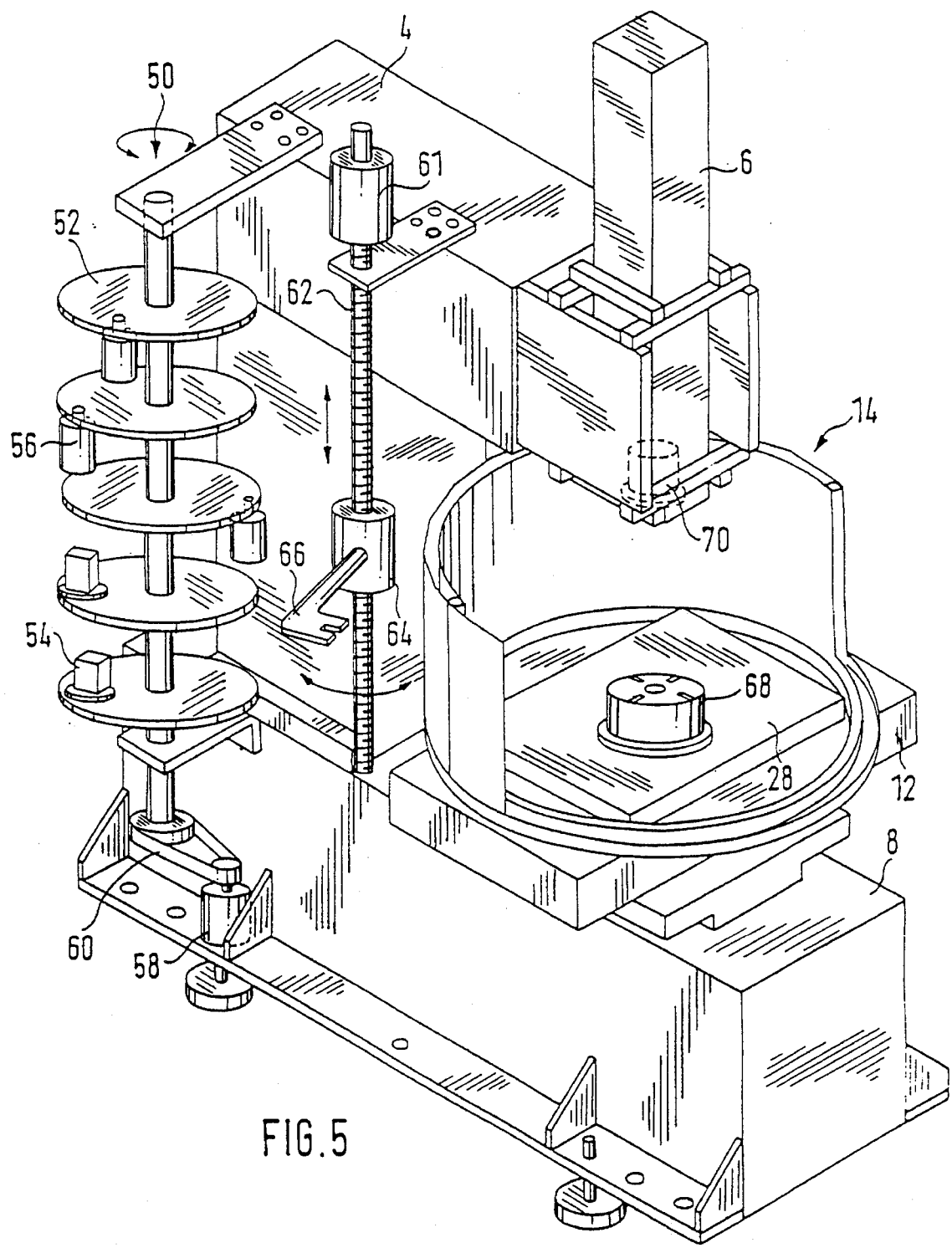
FIG. 5 is a perspective view of still another embodiment.

FIG. 5 illustrates an almost completely automated version of the invention. A cylindrical magazine 50 secured to arm 4 and base 8 comprises a series of disks 52 positioned at various levels. Work 54 and electrodes 56, approximately fifty in the present embodiment can be placed on each disk. Magazine 50 can be maneuvered by a motor 58 and belt 60. A cylinder 64 with interior threads or cogs travels up and down on a rod 62 provided with cogs or threads and driven by a motor 61. A pickup fork 66 pivots back and forth and travels up and down on rod 62. Fork 66 automatically transfers work from magazine 50 to a holder 68 resting on the pallet 28 on work support 12, and electrode to an automatic chuck 70 secured to electrode holder 6. Although it also makes sense for tank 14 to rotate 90° left, this possibility is not illustrated. Numerical controls allow computerization of the entire operation.

FIG. 6 illustrates one version of machine in accordance with the present invention that incorporates dielectric-level regulation with an overflow. The wall of the tank can be opened manually by means of handle 24.

The level regulator is illustrated both in place in the machine in FIG. 6 and by itself in FIG. 6A. It incorporates a motor 74 that is controlled by a coder 72 and drives a cogged or threaded rod 80 by way of a belt 76 and reduction gear 78. Rod 80 extends through a bellows 81. Bellows 81 communicates with a runoff 82. Runoff 82 communicates with a pneumatic or hydraulic cylinder 84. Bellows 81 is squeezed and stretched by rod 80, regulating the level of dielectric in the tank. Cylinder 84 is employed to empty the tank rapidly. It engages for that purpose a plate 85 that seals the bottom of bellows 81. At rest, cylinder 84 forces plate 85 against the tank-end opening of runoff 82 and seals it. When the tank is to be emptied rapidly, cylinder 84 forces plate 85 and bellows 81 upward.

Rod 80 can alternatively be rotated manually by a knob 86. In this event, rapid emptying will be initiated by means of a lever 88.

What is claimed is:

1. An electro-erosion machine comprising a substantially hollow cylindrical tank having a base and a wall along a circumference for holding a liquid dielectric, said wall is divided longitudinally into at least a first and a second wall section, the first wall section is slidably disposed along the circumference for creating an opening in the tank.

2. The electro-erosion machine as in claim 1, wherein the slidably disposed wall section is substantially semicylindrical.

3. The electro-erosion machine as in claim 1, wherein the slidably disposed wall section slides parallel to the second wall section.

4. The electro-erosion machine as in claim 1, wherein the base of the tank has a groove, the second wall section is fixedly attached in the groove.

5. The electro-erosion machine as in claim 4, wherein the first wall section slides back and forth in the groove.

6. The electro-erosion machine as in claim 1, wherein the tank is rotatably mounted.

7. The electro-erosion machine as in claim 1, wherein the tank is connected to a numerical control.

8. The electro-erosion machine as in claim 1, wherein the first wall section slides back and forth on runners.

9. The electro-erosion machine as in claim 1, further comprising a track along the base for guidingly moving the first wall section back and forth on the track.

10. The electro-erosion machine as in claim 9, further comprising base sealing means for sealingly mounting the track to the base.

11. The electro-erosion machine as in claim 10, wherein the base sealing means are inflatable.

12. The electro-erosion machine as in claim 10, wherein the base sealing means are solid seals.

13. The electro-erosion machine as in claim 1, wherein the first wall section slides back and forth on rollers.

14. The electro-erosion machine as in claim 1, further comprising wall sealing means for sealing the at least first and second wall section to one another.

15. The electro-erosion machine as in claim 14, wherein the wall sealing means are inflatable seals.

16. The electro-erosion machine as in claim 14, wherein the wall sealing means are solid seals.

17. The electro-erosion machine as in claim 1, further comprising a motor coupled to the first wall section.

18. The electro-erosion machine as in claim 17, further comprising a cable transmission comprising a roller with at least one coil of cable wrapped around the roller disposed between the motor and the first sliding wall section.

19. The electro-erosion machine as in claim 1, further comprising a level regulator with a screw-driven bellows.

* * * * *